May 16, 1961
C. P. TOLMAN
2,984,099
BULBAR COMPRESSORS
Filed April 8, 1957
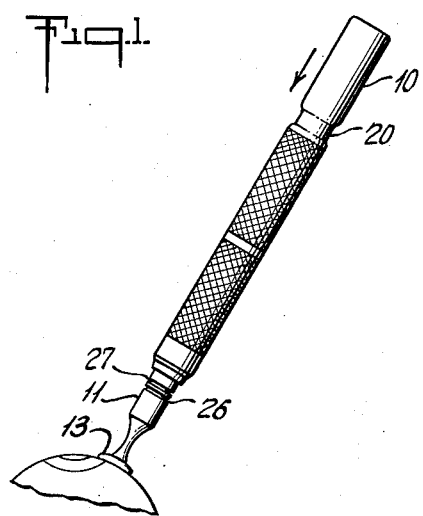
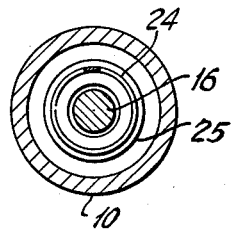
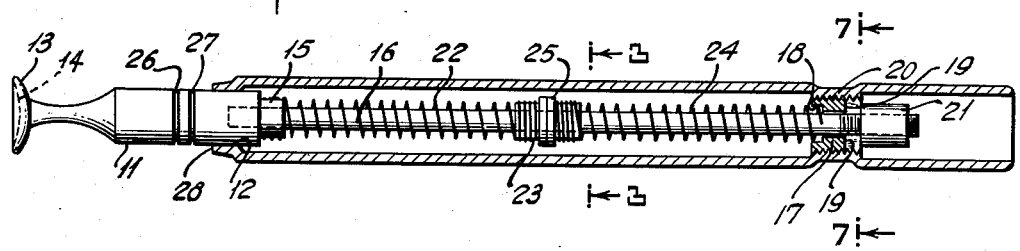
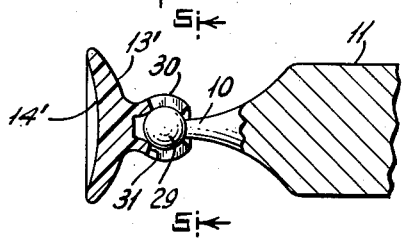
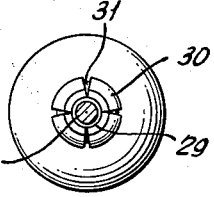
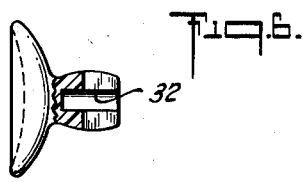
INVENTOR
CHARLES P. TOLMAN
BY
Curtis, Morris & Safford
ATTORNEYS United States Patent Office 2,984,099
Patented May 16, 1961

2,984,099

BULBAR COMPRESSORS

Charles P. Tolman, 83—09 Talbot St.,
Kew Gardens 15, N.Y.

Filed Apr. 8, 1957, Ser. No. 651,239

6 Claims. (Cl. 73—80)

The present invention relates to improvements in devices for applying measured pressure to an eyeball, as in the bulbar compressor test, said devices also being known as eye pressure gauges, or more specifically, bulbar compressors. Instruments of this general class have been used in diagnostic procedures related to determining the presence or absence of hypertension and thus of glaucoma in the eyeball. The existence of excess pressure in the eyeball is attributed to a defect whereby the inflow of aqueous fluid is not adequately offset by an effective outflow. This condition, marked by excess pressure, is commonly intermittent so that the presence of such a defect is not so readily perceptible between periods of hypertension.

To aid in diagnosing glaucoma in these "between periods," i.e., absent actual hypertension, a method has been employed which reveals whether or not operation of the "outflow" mechanism is properly related to the inflow. In general this procedure includes measuring ocular tension; applying predetermined pressure, as 50 grams for example, to the eyeball for a measured period, as 4 minutes; and again measuring ocular tension.

If the second reading shows a decrease in ocular tension to a certain predetermined degree as a result of increased outflow induced by the applied pressure, normal functioning of the outflow mechanism is indicated. If, however, the decrease in tension is substantially less than said certain degree and within limits previously established by experiment, impairment of the outflow mechanism is indicated and may thus identify a glaucomatous condition or tendency.

It will be apparent that the accuracy of conclusions to be drawn from the above procedures will depend at least in part on the accuracy and efficiency in use of the instrument by which the predetermined pressure is applied to the eyeball between said tension readings. Accordingly, it is an object of my invention to provide an accurately calibrated eyeball pressure applicator or bulbar compressor adapted to transmit from the operator's hand to the eyeball the required degree of pressure uniformly over a substantial but relatively minor area thereof within permissible tolerances; and also to enable the operator simultaneously to observe the pressure indicating portion of the applicator and view the instrument engaged portion of the eyeball continuously during the four minute, or other period, of applied pressure. Other advantageous features and beneficial results in use will be pointed out in, or be apparent from, this specification.

A device for applying to and maintaining a substantially constant and uniformly distributed predetermined pressure over a relatively minor external surface area of the eyeball according to my invention includes a casing and a plunger slidably mounted therein. At the outer or exposed end of said plunger is a foot or contact member having an eyeball shape conforming outer end face, i.e. concave in cross sectional contour, so as to distribute the applied pressure substantially uniformly over a predetermined relatively minor exposed area of the eyeball corresponding in extent to the area of the concave face, and with minimum likelihood of slipping or accidental displacement or malpositioning of the pressure foot during the period of applied pressure. Pressure indicating means interposed conveniently between the casing and the pressure foot are provided to enable the operator to observe continuously and thus maintain a substantially constant degree or quantity of applied pressure, said means including a readily visible fiducial marking or markings arranged on the plunger stem between the casing and the pressure foot and in such proximity thereto that the adjacent end edge of the casing functions as a readily visible reference line in relation to said fiducial marking while the instrument is in use. A compression spring mounted in the casing is loaded to a predetermined extent to bias said plunger outwardly toward extended or normally inoperative position. Stop means are also provided to limit the extent of this outward thrust of the plunger and thus to maintain the parts normally in proper assembled condition for use when needed. It is also a feature of a testing device embodying the present invention, to include means for varying the effective length of the compression spring so that it may readily be calibrated to impart an accurately measured pressure to the foot carrying plunger.

One embodiment of my said invention is fully described in this specification and illustrated in the appended drawings wherein:

Figure 1 is a side elevation of a bulbar compressor in approximately effective position as applied to an eyeball in a typical bulbar compression test;

Figure 2, a central longitudinal section on enlarged scale of the device shown in Figure 1;

Figure 3, a transverse section on the line 3—3 of Figure 2;

Figure 4, a fragmentary view partly in central longitudinal section showing a modified form of pressure foot releasably joined to the plunger by a swivel connection;

Figure 5, a transverse section on the line 5—5 of Figure 4;

Figure 6, a side elevation of a modified form of pressure foot showing a socket portion thereof in section; and Figure 7 is a transverse section on the line 7—7 of Figure 2.

Referring to the drawings, the pressure applying device therein shown includes a tubular casing 10 open at both ends and a plunger 11 mounted at one open end thereof and freely slidable in a bearing 12. The outer end of said plunger is formed with or supports a pressure foot or plate 13 having an eyeball engaging or contact surface 14 of concave spherical sectional contour, which may conveniently be formed on a radius of 16 mm. to conform approximately to commonly occurring eyeball surface contours and dimensions.

The inner end of plunger 11 is provided with an inwardly extending collar or bushing 15. An axially arranged stem 16 extends inwardly from said inner end of plunger 11 and centrally through said bushing 15 and through a threaded guide bearing 17 or spring retainer having a recess 18 at its inner end and transverse slots 19, Figure 7, at its outer end. Casing 10 is advantageously formed, as by spinning, with a portion of its wall deformed to provide an interiorly threaded neck 20. Threaded guide bearing 17 is engaged with said neck 20 and adjustable axially therein for the purpose of calibrating the instrument in a manner to be described, it being contemplated that bearing 17 may conveniently be rotated by means of a suitable tool applied to the transverse slots 19. A nut on the outer end of stem 16 provides a stop 21 which is normally biased to bear against the outer face of bearing 17 and thereby to limit the extent of spring pressed endwise outward movement of plunger 11 in relation to the open foot end of casing 10.

As seen in Figure 2, a compression spring 22 is arranged in casing 10 with one end engaged around bushing 15 of plunger 11 and the other end engaging a bushing 23 slidably arranged on an intermediate portion of stem 16. Another compression spring 24 is positioned around stem 16 with its inner end engaging on bushing 25 which is slidably arranged on said stem and in yielding engagement with said bushing 23 and with its outer end engaging and being retained in recess 18 of said guide bearing 17. Said springs 22 and 24 may advantageously be made of a titanium-copper alloy or other material having favorably stable tensile characteristics under conditions to which the bulbar compressor is subjected in normal use.

The initial assembly of springs and plunger in the casing is preferably such as to preload said springs to a pressure somewhat below intended operating pressure. Thereafter, the calibration or adjustment necessary to produce the desired predetermined operating pressure is made by rotating guide bearing 17 in a direction to compress said springs. In practice this adjustment will advantageously provide an operating pressure of 50 grams where the device is employed for bulbar testing although adjustments to other pressures may be made where the device is applied to other uses or in special cases.

As seen in Figures 1 and 2, plunger 11 is provided with fiducial markings, as spaced annular parallel grooves 26, 27, located between foot plate 13 and the open end edge 28 of casing 10. The arrangement of parts is such that when the device is properly calibrated, for example to transmit 50 grams pressure, and hand pressure in that amount is applied by an operator to said casing 10 in the direction of the arrow, Figure 1, and thus to foot plate 13 through plunger 11 and springs 22, 24, the edge 28 of said casing 10 will be observed to move toward and into indicating position between said grooves, thus informing the test operator that the eyeball, Figure 1, is being subjected to said pressure of 50 grams over the area covered by the cup face 14 of foot 13.

The foot plate or pressure foot may be mounted on or connected to plunger 11 in any suitable manner. For example, it may be integral therewith as in Figures 1 and 2; or it may be separable therefrom, as in Figure 4, and hence it may be of the same or of different material. Under some circumstances, as where tests are given to large assemblies or groups, time and safety considerations indicate a possible advantage in employing separate readily attachable and detachable pressure foot units, as 13' Figure 4, or as shown in Figure 6, for example.

The pressure foot 13', Figure 4, which may be formed of suitable flexible material is provided with a gripping socket portion of such shape, dimensions and elastic properties as to receive and loosely grip a ball 29 formed at the outer end of plunger 11. Where the pressure foot is made of polystyrene, or other suitable material, the socket portion thereof can be formed, for example, with ball retaining fingers 30 separated by cuts or slots 31, Figures 4 and 5.

As seen in Figure 6, the separate pressure foot includes a neck portion having a central axial socket 32 preferably of a size and shape to receive and frictionally retain connection with an appropriately shaped and dimensioned outer terminal (not shown) of a plunger such as 11 and otherwise as previously described.

In a typical test procedure for glaucoma particularly in periods when the eye is not under tension induced by that impairment, a reading of the eyeball pressure or tension is taken by the use of any well known and appropriate instrument for that purpose. The operator thereafter applies the concave face of the pressure foot, as 13, to a portion of the eyeball, attempting as nearly as possible to direct hand pressure of 50 grams, for example, through the casing on handle 10 in such a direction that the resultant 50 grams pressure on the eyeball will be substantially uniform over the area engaged by the pressure foot. Thus, an instrument having a swivel connected pressure foot, as 13', Figure 4, facilitates this purpose under some conditions by permitting uniform close testing contact even where the axis of handle 10 may not remain accurately radial in relation to the eyeball surface during the four minute pressure applying period. Also during this period, the tester readily observes the markings 26, 27 thereby insuring that he can promptly perceive any variation in the amount or extent of predetermined applied pressure, as 50 grams, and promptly modify his hand pressure to effect the necessary correction. Thus, the placing of markings 26, 27 in close angular relation to pressure foot 13 (as viewed by the tester) facilitates optimum control of the pressure applying step which is reflected in the more accurate or more nearly correct conclusions to be drawn from comparison of the "before" and "after" quantitative tension readings involved in the eyeball tension test procedure above described.

I claim:
1. Device for applying pressure to an eyeball in connection with a bulbar compressor test comprising a casing having an end opening, a plunger slidably mounted therein with one end portion exposed beyond said opening, a pressure foot mounted on the outer end of said exposed end portion of the plunger and having an end surface of concave eyeball conforming cross sectional contour, a compression spring mounted in said casing to applying a predetermined outwardly directed pressure to said plunger, stop means arranged and adapted to limit the extent of outward spring induced movement of said plunger, means for calibrating the spring pressure by varying the effective length of said spring, and a fiducial marking carried by said plunger and movable therewith in relation to an open end edge of the casing to facilitate simultaneous observation by an operator of said marking and of the eyeball while the latter is subjected to testing pressure applied through said spring and said pressure foot.

2. Device for applying and maintaining a predetermined substantially uniform value of external pressure to a relatively minor area of the exposed surface of an eyeball in connection with a bulbar compressor test comprising a tubular casing having an end opening, a plunger slidably mounted therein with its outer end portion extending beyond said opening and providing an eyeball contour conforming circular contact surface of minor area as compared to the area of the exposed surface portions of the eyeball, adjustable spring means mounted in said casing and operating on said plunger to bias the same toward a predetermined maximum extended position, and a fiducial marking on said plunger and movable therewith in relation to the edge of said end opening and arranged and adapted to register with said edge while the predetermined value of manual pressure is maintained through said casing, said spring means, said plunger, and said contact surface on said minor area of the eyeball surface.

3. Device for applying pressure to an eyeball in connection with a bulbar compressor test comprising a casing having an end opening, a plunger slidably mounted therein with one end portion exposed beyond said opening and with longitudinally spaced portions slidably engaging guide bearings within and at opposite end portions of the casing, a pressure foot mounted on the outer end of said plunger and having an end surface of concave eyeball-conforming cross-sectional contour, compression spring means mounted in said casing and arranged and adapted to exert a predetermined outwardly directed pressure on said plunger, means for calibrating said spring means by varying the effective length thereof, stop means arranged and adapted to limit the extent of outward spring-pressed movement of said plunger, and a fiducial marking carried by said plunger in operative relation to the open end edge of the casing to facilitate simultaneous observation by the operator of said marking and of the eyeball while the latter is subjected to testing pressure applied and maintained through said spring means and said pressure foot.

4. Testing device according to claim 3 and wherein said spring means includes separate springs mounted on and coaxial with said plunger, and contiguously disposed bushings are slidably mounted on said plunger between said springs with an end of one spring bearing against one of said bushings and an end of the other of said springs bearing in the opposite direction against the other of said bushings.

5. Device for applying a predetermined value of external pressure to a portion of an eyeball in connection with a bulbar compressor test, comprising a casing having an end opening, a plunger slidably mounted therein with one end portion exposed beyond said opening and with longitudinally spaced portions slidably engaging guide bearings provided at opposite end portions of the casing, a pressure foot mounted on the outer end of said plunger and having an end surface of concave eyeball-conforming cross-sectional contour, compression spring means mounted in said casing and arranged and adapted to apply a predetermined outwardly directed pressure to said plunger, stop means arranged and adapted to limit the extent of outward spring-pressed movement of said plunger, a fiducial marking carried by said plunger in operative relation to the open end edge of the casing to facilitate simultaneous observations by an operator of said marking and of the eyeball while the latter is subjected to testing pressure applied through said casing, said spring means and the pressure foot, said casing being of reduced cross-sectional area at its foot end to provide a plunger guiding interior surface and being of reduced sectional area at an intermediate portion to provide an interiorly exposed threaded shoulder, a spring retainer threaded on said shoulder and engaging one end of said spring means to retain the same in pressure-exerting relation to said plunger, a guide stem extending from said plunger through said spring and through a central guide bore in said retainer, and stop means cooperating between said casing and said guide stem to limit the extent of spring-pressed outward movement of said plunger.

6. Device for applying pressure to an eyeball in connection with a bulbar compressor test comprising a casing having an end opening, a plunger slidably mounted therein with one end portion exposed beyond said opening and with longitudinally spaced portions slidably engaging guide bearings within and at opposite end portions of the casing, a pressure foot mounted on the outer end of said plunger and having an end surface of concave eyeball-conforming cross-sectional contour, compression spring means mounted in said casing and arranged and adapted to exert a predetermined outwardly directed pressure on said plunger, means for calibrating said spring means by varying the effective length thereof, stop means arranged and adapted to limit the extent of outward spring-pressed movement of said plunger, and a fiducial marking carried by said plunger in operative relation to the open end edge of the casing, and, when in said stop position, being normally axially spaced from said end edge of the casing and in position to be reached by said edge when the pressure foot is held in engagement with an eyeball surface and the predetermined value of applied pressure in manually exerted on said casing in a direction toward the eyeball.

References Cited in the file of this patent

UNITED STATES PATENTS

| 1,637,421 | Lipschutz | Aug. 2, 1927 |
| 2,572,389 | Rice | Oct. 23, 1951 |
| 2,622,439 | Copper | Dec. 23, 1952 |

FOREIGN PATENTS

| 559,952 | Germany | Sept. 26, 1932 |